(12) United States Patent
Barrera et al.

(10) Patent No.: US 9,957,852 B2
(45) Date of Patent: May 1, 2018

(54) CUSHION RING ASSEMBLY FOR A SPROCKET DRIVEN BY A CHAIN

(71) Applicant: DELPHI TECHNOLOGIES IP LIMITED, St. Michael (BB)

(72) Inventors: Leonel A. Barrera, Chihuahua (MX); Cesar C. Chavez, Chihuahua (MX)

(73) Assignee: DELPHI TECHNOLOGIES IP LIMITED (BB)

( * ) Notice: Subject to any disclaimer, the term of this patent is extended or adjusted under 35 U.S.C. 154(b) by 74 days.

(21) Appl. No.: 15/181,522

(22) Filed: Jun. 14, 2016

(65) Prior Publication Data

US 2017/0356312 A1 Dec. 14, 2017

(51) Int. Cl.
| F01L 1/02 | (2006.01) |
| F01L 1/344 | (2006.01) |
| F16H 55/30 | (2006.01) |
| F16H 7/06 | (2006.01) |
| F16H 55/14 | (2006.01) |

(52) U.S. Cl.
CPC .............. *F01L 1/3442* (2013.01); *F16H 7/06* (2013.01); *F16H 55/14* (2013.01); *F16H 55/303* (2013.01); *F01L 2001/34426* (2013.01); *F01L 2001/34459* (2013.01); *F16H 2055/306* (2013.01)

(58) Field of Classification Search
CPC ........... F01L 1/3442; F01L 2001/34426; F01L 2001/34459; F16H 7/06; F16H 55/14; F16H 55/303; F16H 2055/306
See application file for complete search history.

(56) References Cited

U.S. PATENT DOCUMENTS

| 3,324,737 A | 6/1967 | Onulak |
| 4,261,214 A | 4/1981 | Watanabe et al. |
| 5,176,587 A | 1/1993 | Mott |
| 5,360,378 A | 11/1994 | Suzuki et al. |
| 5,980,408 A | 11/1999 | Schulz |
| 6,652,402 B2 | 11/2003 | Poiret et al. |
| 7,862,460 B2 | 1/2011 | Chekansky et al. |
| 8,056,519 B2 | 11/2011 | Cuatt et al. |
| 8,083,624 B2 | 12/2011 | Young |
| 8,584,633 B2 | 11/2013 | David et al. |
| 9,149,965 B2 | 10/2015 | Nielsen |
| 2003/0176251 A1* | 9/2003 | Hamilton ................ F16H 55/06 474/161 |
| 2008/0261738 A1 | 10/2008 | Stout |

(Continued)

*Primary Examiner* — Zelalem Eshete
(74) *Attorney, Agent, or Firm* — Joshua M. Haines

(57) ABSTRACT

A sprocket assembly which is either driven by a drive chain or which drives the drive chain includes a hub centered about a sprocket axis and defining a hub radially outer surface; a plurality of sprocket teeth extending radially outward from the hub; and a cushion ring assembly adjacent to the plurality of sprocket teeth and circumferentially surrounding the hub radially outer surface. The cushion ring assembly includes a cushion ring adjacent to the plurality of sprocket teeth and circumferentially surrounding the hub radially outer surface; the cushion ring being resilient and compliant. The cushion ring assembly also each includes a retention ring which is partially embedded within the cushion ring and which engages the hub radially outer surface in an interference fit, the retention ring providing axial and radial retention of the cushion ring to the hub.

11 Claims, 5 Drawing Sheets

(56) References Cited

U.S. PATENT DOCUMENTS

2009/0093329 A1    4/2009   Markley et al.
2010/0288215 A1   11/2010   Takemura et al.
2011/0300977 A1   12/2011   Hayami et al.
2012/0255509 A1   10/2012   Lichti et al.

* cited by examiner

CUSHION RING ASSEMBLY FOR A SPROCKET DRIVEN BY A CHAIN

TECHNICAL FIELD OF INVENTION

The present invention relates to a sprocket with cushion rings which minimize noise and vibrations resulting from a complementary chain engaging the sprocket; more particularly to a sprocket with cushion rings which are each part of a cushion ring assembly with a retention ring which retains the cushion ring to the sprocket; and still even more particularly to a camshaft phaser which includes such a sprocket and cushion ring assembly.

BACKGROUND OF INVENTION

Drive chains and sprockets have long been used to transmit rotational motion and to provide timing between rotating members. Drive chains typically include a series of cylindrical rollers held together with links at each end of the rollers. The rollers engage sprocket teeth which extend radially outward from the sprocket. One problem associated with drive chains and sprockets is noise that may result from engagement of the drive chain and the sprocket during operation. In order to minimize noise, it is known to bond a cushion ring, made of a resilient and compliant material such as an elastomer, to each side of the sprocket. The links of the drive chain engage the cushion rings during operation, thereby reducing noise. While these known cushion rings may be effective at reducing noise and vibration, separation of the cushion ring from the sprocket is a known issue which results from the cushion rings being subjected to cyclical compression and relaxation during use.

U.S. Pat. No. 7,862,460 to Chekansky et al. illustrates prior art arrangements for retaining cushion rings on a sprocket. More specifically Chekansky et al. shows prior art arrangements where the cushion rings are located within an annular groove formed either by cutting the groove directly in the sprocket or by forming the groove with a stack of annular bodies. While the channel may provide some retention of the cushion rings in the axial direction, i.e. in the direction of the axis about which the sprocket rotates, the channel does not provide retention in the radial direction relative to the axis about which the sprocket rotates. Consequently, the cushion rings are still vulnerable to separation from the sprocket.

What is needed is a sprocket assembly which minimizes or eliminates one or more of the shortcomings as set forth above.

SUMMARY OF THE INVENTION

A sprocket assembly which is either driven by a drive chain or which drives the drive chain includes a hub centered about a sprocket axis and defining a hub radially outer surface; a plurality of sprocket teeth extending radially outward from the hub such that the plurality of sprocket teeth divide the hub radially outer surface into a forward section and a rearward section; a forward cushion ring assembly adjacent to the plurality of sprocket teeth and circumferentially surrounding the forward section of the hub radially outer surface; and a rearward cushion ring assembly adjacent to the plurality of sprocket teeth and circumferentially surrounding the rearward section of the hub radially outer surface. The forward cushion ring assembly and the rearward cushion ring assembly each include a cushion ring adjacent to the plurality of sprocket teeth and circumferentially surrounding the hub radially outer surface; the cushion ring being resilient and compliant. The forward cushion ring assembly and the rearward cushion ring assembly also each include a retention ring which is partially embedded within the cushion ring and which engages the hub radially outer surface in an interference fit, the retention ring providing axial and radial retention of the cushion ring to the hub. The retention ring prevents separation of the cushion ring from the hub, thereby increasing the service life of the cushion ring. The retention ring prevents separation of the cushion ring from the hub by providing a structure to which the cushion ring is interlocked. In this way, the retention ring provides support in both the axial and radial directions.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

While the present invention is generically applicable to any sprocket which is driven by a drive chain, the invention will be described in the context of an internal combustion engine which includes a camshaft phaser attached to a camshaft which causes intake and/or exhaust valves to open and close. The camshaft phaser includes a sprocket with sprocket teeth which engage a drive chain. In addition to mating with the sprocket teeth of the camshaft phaser, the drive chain also mates with a sprocket of a crankshaft which is rotated by reciprocating pistons. Consequently, rotation of the crankshaft causes the camshaft phaser to rotate in a fixed ratio which is typically two rotations of the crankshaft to one rotation of the camshaft phaser. The camshaft phaser is a mechanism which allows the timing between the crankshaft and the camshaft to be varied, thereby varying the opening and closing time of the intake and/or exhaust valves in order to achieve desired combustion within the internal combustion engine.

Figure 1:
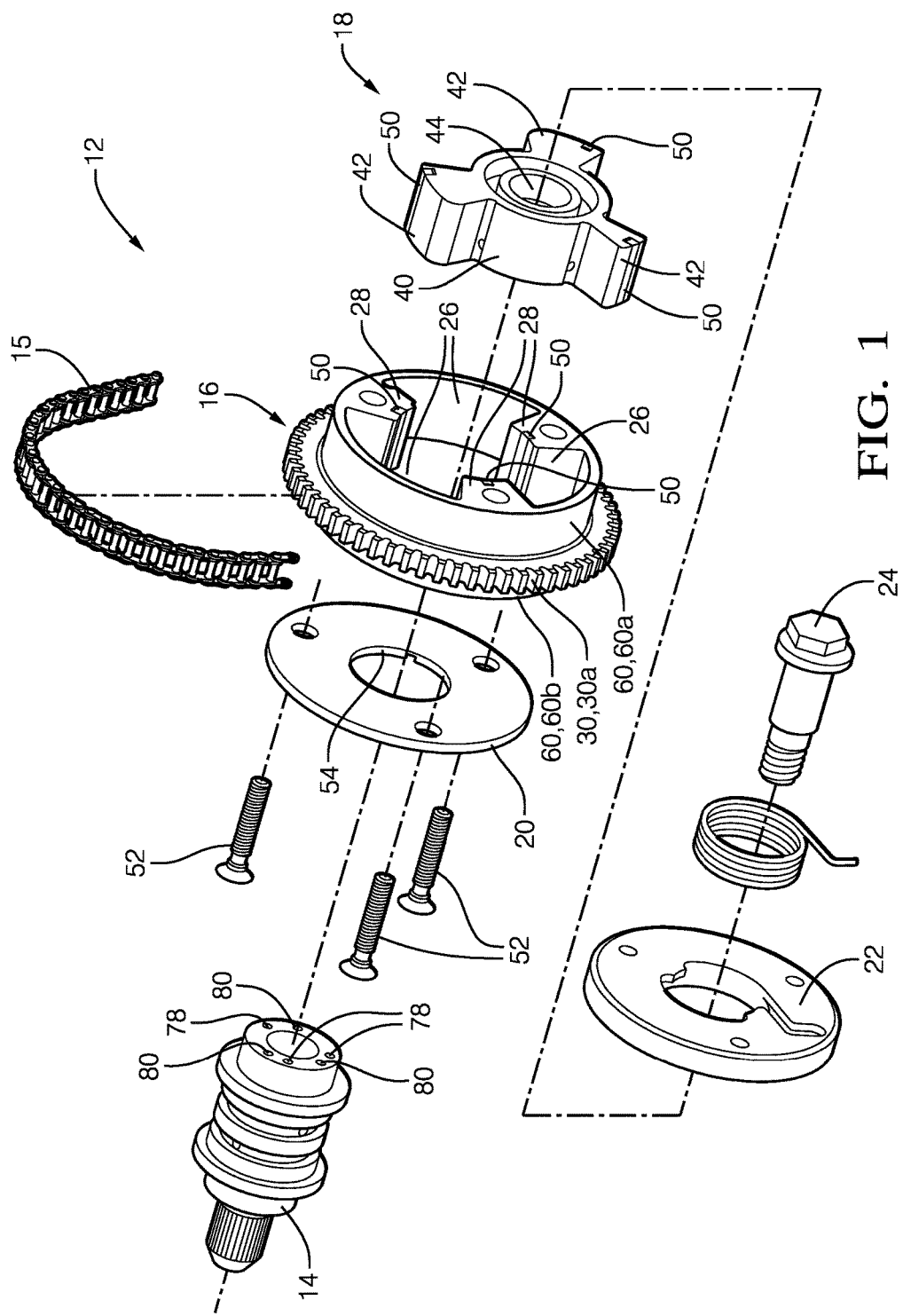
FIG. 1 is an exploded isometric view of a camshaft phaser in accordance with the present invention.
Figure 2:
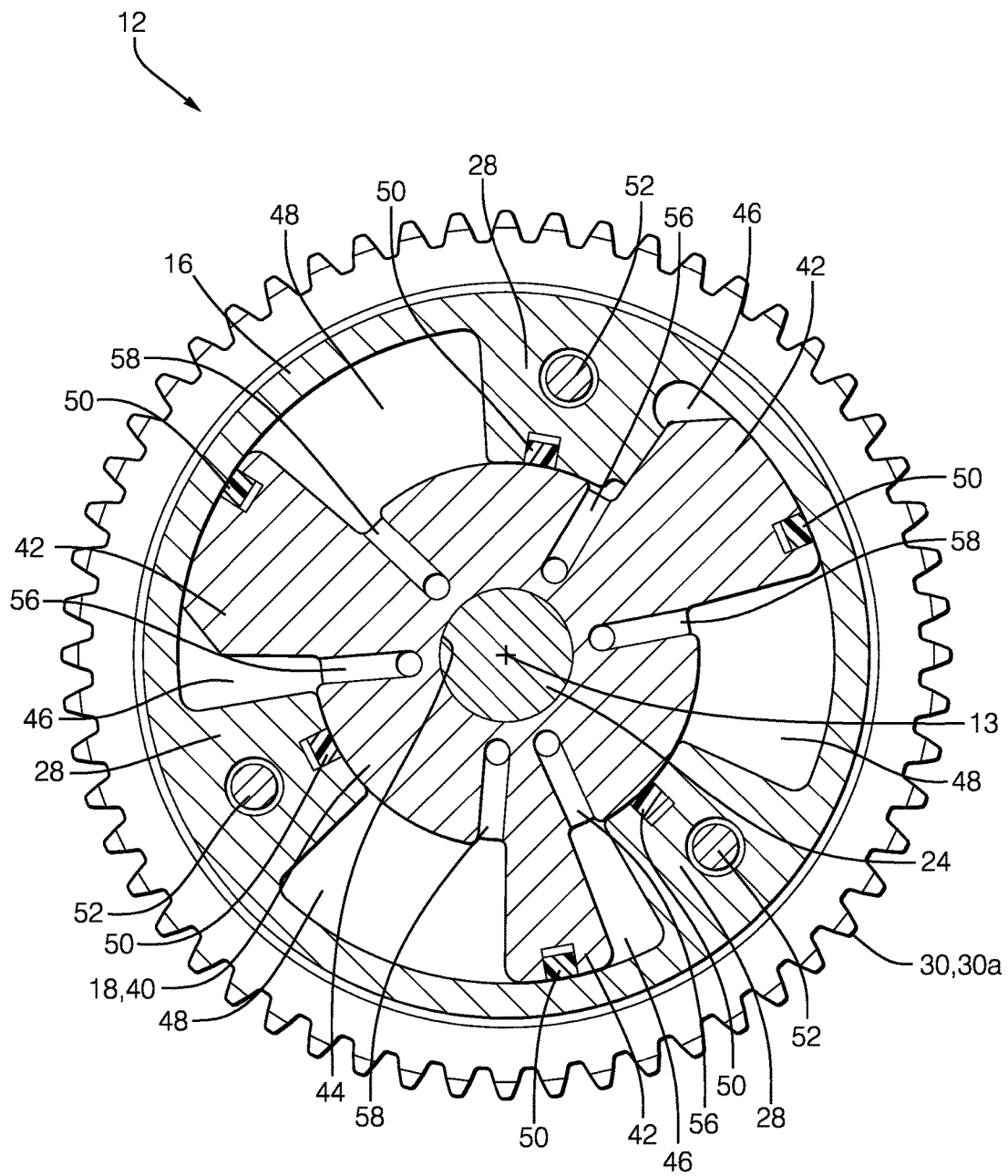
FIG. 2 is a radial cross-sectional view of the camshaft phaser of FIG. 1.
Figure 3:
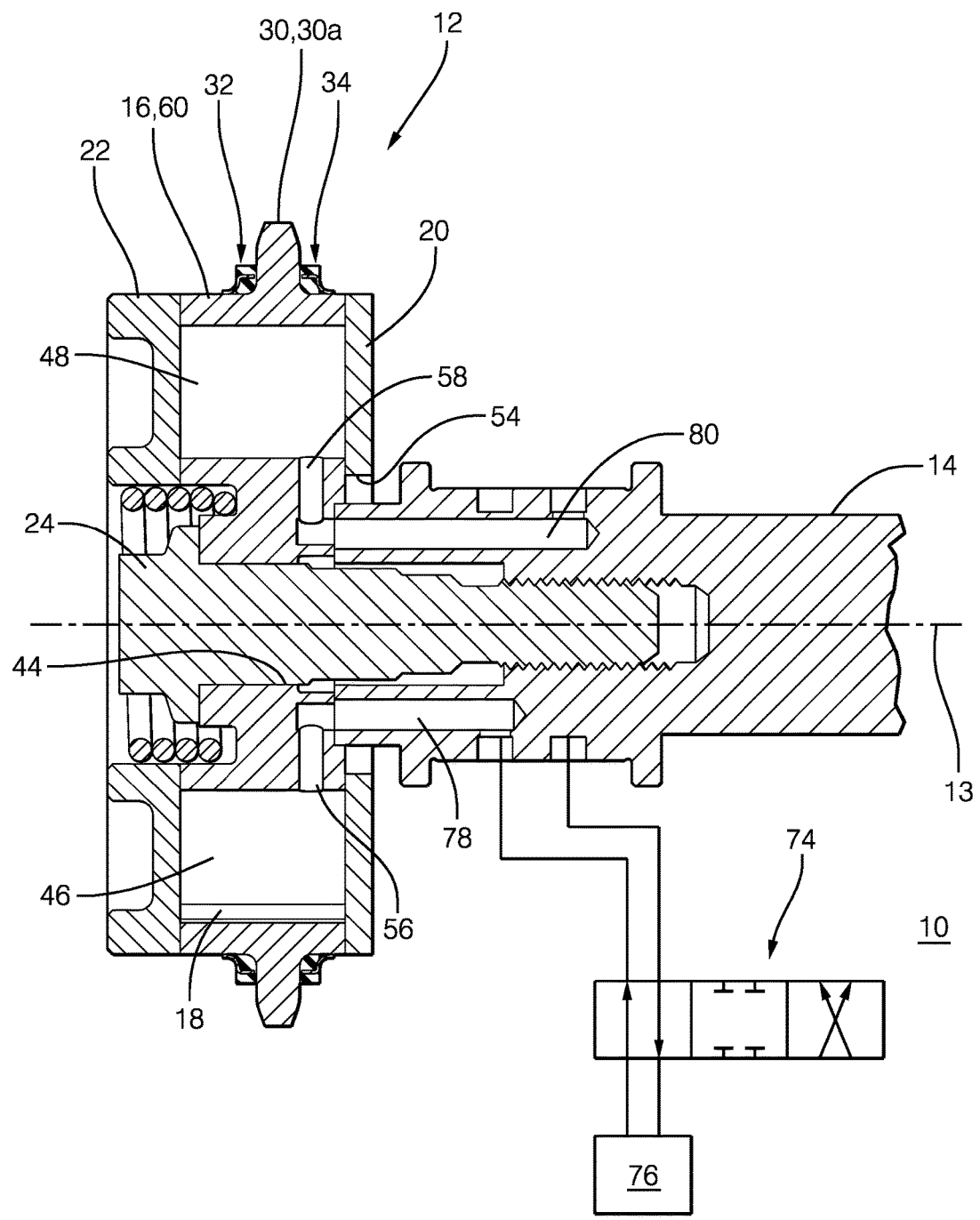
FIG. 3 is an axial cross-sectional view of the camshaft phaser of FIG. 1.
Figure 4:
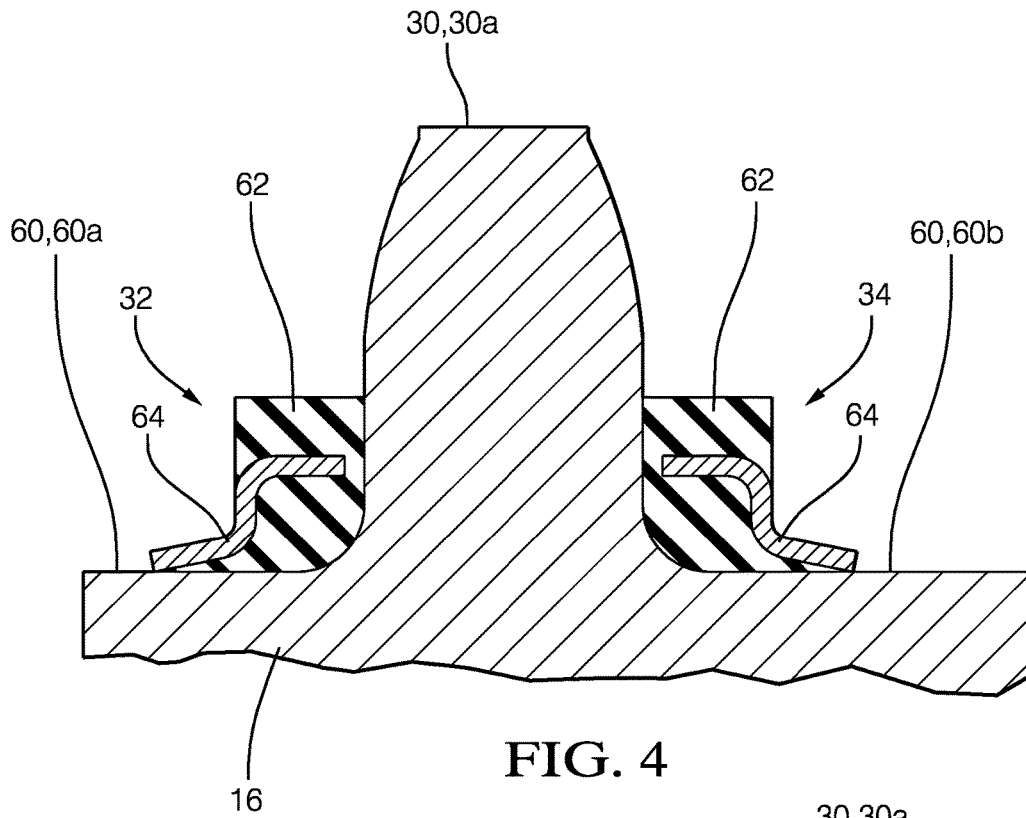
FIG. 4 is an enlarged view of a portion of FIG. 3 showing a sprocket and cushion ring assemblies of the camshaft phaser.
Figure 5:
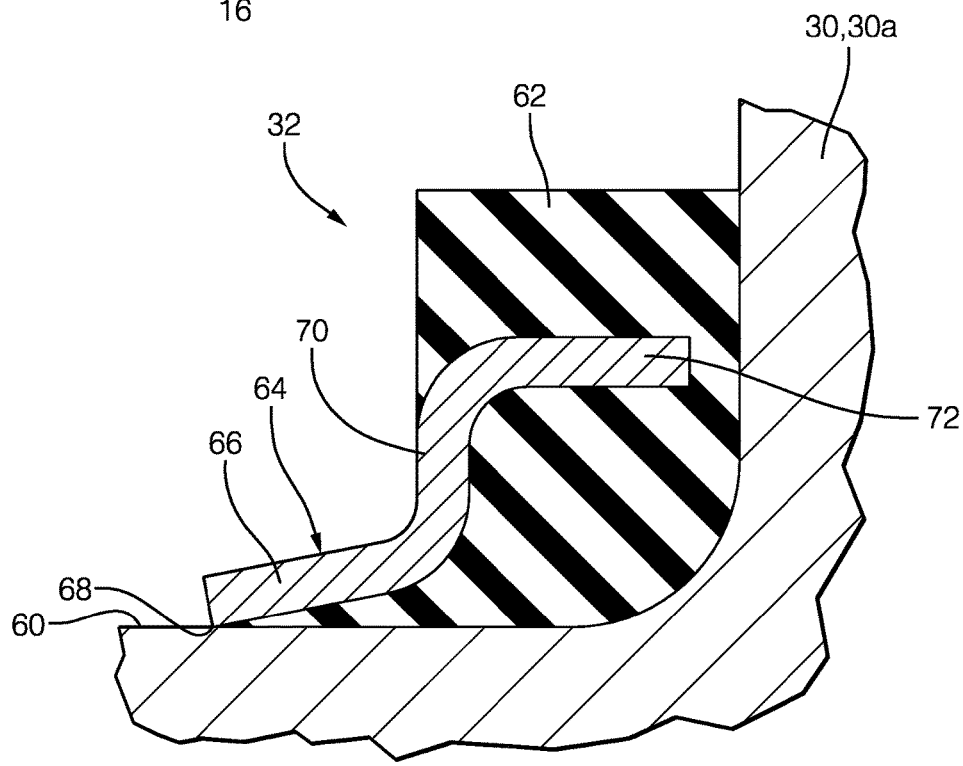
FIG. 5 is an enlarged view of a portion of FIG. 4 showing detail of one of the cushion ring assemblies.
Figure 6:
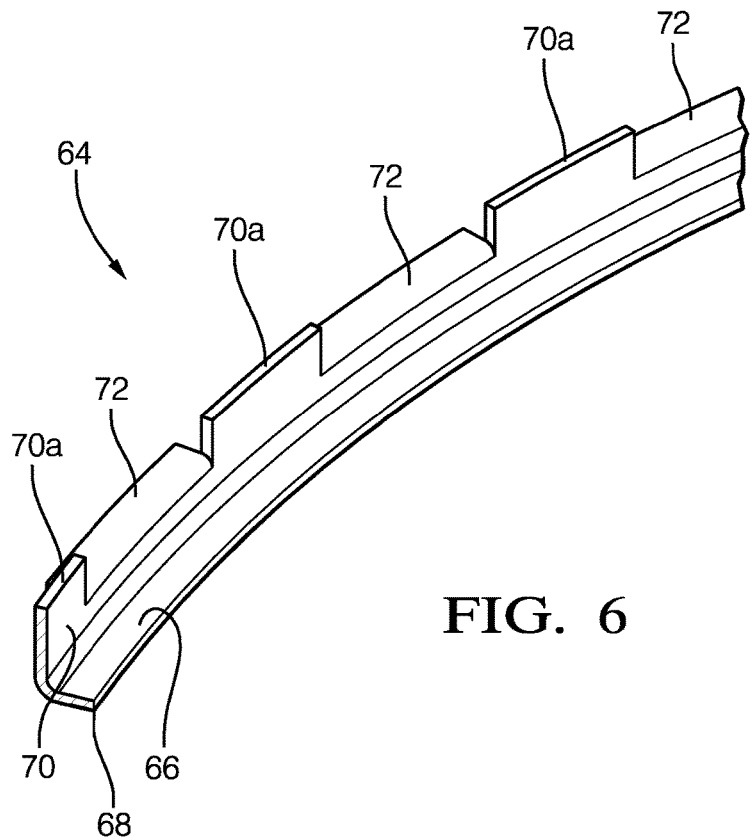
FIG. 6 is an isometric view of a portion of a retention ring of the cushion ring assemblies shown in FIGS. 4 and 5.
Figure 7:
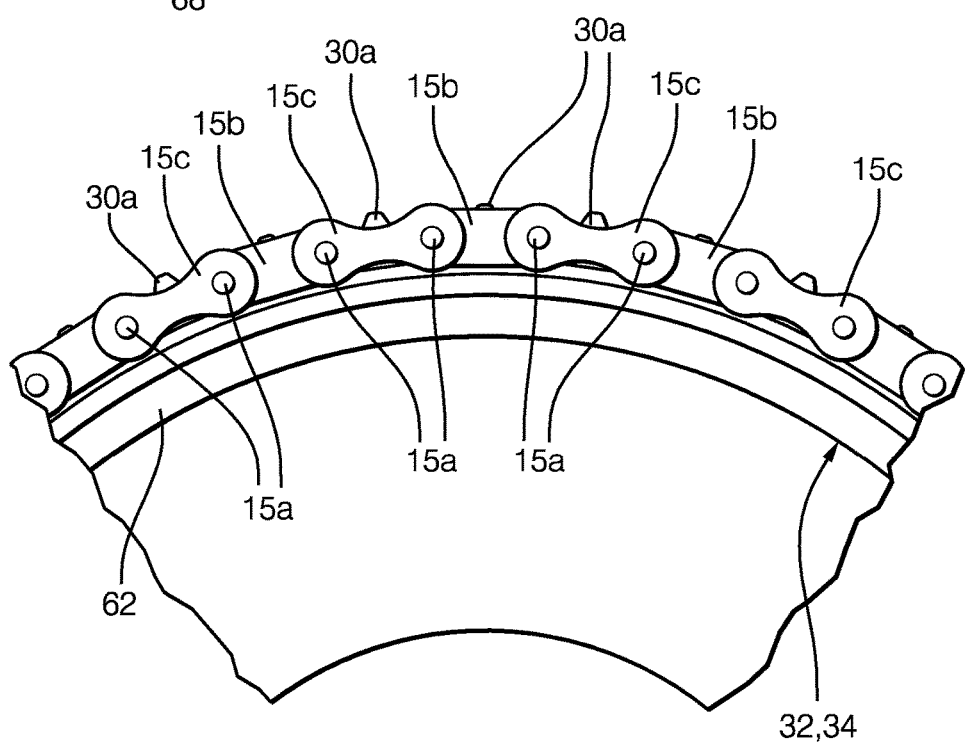
FIG. 7 is an elevation view of a drive chain engaging the sprocket and cushion ring assembly.

In accordance with a preferred embodiment of this invention and referring to FIGS. 1-7, an internal combustion engine 10 is shown which includes a camshaft phaser 12. Internal combustion engine 10 also includes a camshaft 14 which is rotatable about an axis 13 based on rotational input from a crankshaft (not shown) and a drive chain 15 driven by a plurality of reciprocating pistons (also not shown). As camshaft 14 is rotated, it imparts valve lifting and closing motion to intake and/or exhaust valves (not shown) as is well known in the internal combustion engine art. Camshaft phaser 12 allows the timing between the crankshaft and camshaft 14 to be varied. In this way, opening and closing of the intake and/or exhaust valves can be advanced or retarded in order to achieve desired engine performance.

Camshaft phaser 12 generally includes a stator 16, a rotor 18 disposed coaxially within stator 16, a back cover 20 closing off one end of stator 16, a front cover 22 closing off the other end of stator 16, and a camshaft phaser attachment bolt 24 for attaching camshaft phaser 12 to camshaft 14. The various elements of camshaft phaser 12 will be described in greater detail in the paragraphs that follow.

Stator 16 is generally cylindrical and includes a plurality of radial chambers 26 defined by a plurality of lobes 28 extending radially inward. In the embodiment shown, there are three lobes 28 defining three radial chambers 26, however, it is to be understood that a different number of lobes 28 may be provided to define radial chambers 26 equal in quantity to the number of lobes 28. Stator 16 may also include a sprocket 30 formed integrally therewith or otherwise fixed thereto. Sprocket 30 includes a plurality of sprocket teeth 30a which extend radially outward from stator 16 such that sprocket teeth 30a are equally spaced circumferentially around stator 16. In this way, sprocket 30 is configured to be driven by drive chain 15 which is driven by the crankshaft of internal combustion engine 10. A forward cushion ring assembly 32 is positioned adjacent to sprocket 30 and circumferentially surrounds stator 16 on one side of sprocket 30. Similarly, a rearward cushion ring assembly 34 is positioned adjacent to sprocket 30 and circumferentially surrounds stator 16 on the side of sprocket 30 that is opposite of forward cushion ring assembly 32. Forward cushion ring assembly 32 and rearward cushion ring assembly 34 will be described in detail later.

Drive chain 15 is a conventional drive chain which is commonly used for transmission of mechanical power in a variety of machinery. Drive chain 15 may include a series of cylindrical rollers 15a held together by inner links 15b and outer links 15c. Cylindrical rollers 15a engage sprocket 30 between adjacent sprocket teeth 30a, thereby causing cylindrical rollers 15a to impart rotation on stator 16. As mentioned previously, drive chain 15 is convention with further features and details being shown in, by way of non-limiting example only, U.S. Pat. No. 5,176,587 to Mott and U.S. Pat. No. 3,324,737 to Onulak, the disclosures of which are each incorporated herein by reference in their entirety.

Rotor 18 includes a central hub 40 with a plurality of vanes 42 extending radially outward therefrom and a central through bore 44 extending axially therethrough. The number of vanes 42 is equal to the number of radial chambers 26 provided in stator 16. Rotor 18 is coaxially disposed within stator 16 such that each vane 42 divides each radial chamber 26 into advance chambers 46 and retard chambers 48. The radial tips of lobes 28 are mateable with central hub 40 in order to separate radial chambers 26 from each other. Each of the radial tips of lobes 28 and vanes 42 may include one of a plurality of wiper seals 50 to substantially seal adjacent advance chambers 46 and retard chambers 48 from each other.

Back cover 20 is sealingly secured, using cover bolts 52, to the axial end of stator 16 that is proximal to camshaft 14. Tightening of cover bolts 52 prevents relative rotation between back cover 20 and stator 16. Back cover 20 includes a back cover central bore 54 extending coaxially therethrough. The end of camshaft 14 is received coaxially within back cover central bore 54 such that camshaft 14 is allowed to rotate relative to back cover 20. In an alternative arrangement, sprocket 30 may be integrally formed or otherwise attached to back cover 20 rather than stator 16.

Similarly, front cover 22 is sealingly secured, using cover bolts 52, to the axial end of stator 16 that is opposite back cover 20. Cover bolts 52 pass through stator 16 and threadably engage front cover 22, thereby clamping stator 16 between back cover 20 and front cover 22 to prevent relative rotation between stator 16, back cover 20, and front cover 22. In this way, advance chambers 46 and retard chambers 48 are defined axially between back cover 20 and front cover 22.

Camshaft phaser 12 is attached to camshaft 14 with camshaft phaser attachment bolt 24 which extends coaxially through central through bore 44 of rotor 18 and threadably engages camshaft 14, thereby by clamping rotor 18 securely to camshaft 14. In this way, relative rotation between stator 16 and rotor 18 results in a change in phase or timing between the crankshaft of internal combustion engine 10 and camshaft 14.

Oil is selectively supplied to advance chambers 46 and vented from retard chambers 48 in order to cause relative rotation between stator 16 and rotor 18 which results in advancing the timing of camshaft 14 relative to the crankshaft of internal combustion engine 10. Conversely, oil is selectively supplied to retard chambers 48 and vented from advance chambers 46 in order to cause relative rotation between stator 16 and rotor 18 which results in retarding the timing of camshaft 14 relative to the crankshaft of internal combustion engine 10. Advance oil passages 56 may be provided in rotor 18 for supplying and venting oil from advance chambers 46 while retard oil passages 58 may be provided in rotor 18 for supplying and venting oil from retard chamber 48. Supplying and venting of oil to and from advance chambers 46 and retard chambers 48 may be controlled by a multi-way oil control valve that may be located either within camshaft phaser 12 as is known in the art, for example as shown in United States Patent Application Publication No. US 2012/0255509 A1 to Lichti et al. which is incorporated herein by reference in its entirety. Alternatively, the multi-way oil control valve may be located external to camshaft phaser 12 as is known in the art, for example as shown in United States Patent Application Publication No. US 2010/0288215 A1 to Takemura et al. which is incorporated herein by reference in its entirety. In this way, rotor 18 rotates within stator 16 between a maximum advance position and a maximum retard position as determined by the space available for vanes 42 to move within radial chambers 26.

As described herein, camshaft phaser 12 may generically be referred to as a sprocket assembly where stator 16 is a hub of the sprocket assembly from which sprocket teeth 30a radially extend. Stator 16 defines a hub radially outer surface 60 such that sprocket teeth 30a divide hub radially outer surface 60 into a forward section 60a and a rearward section 60b. In this way, forward cushion ring assembly 32 circumferentially surrounds forward section 60a of hub radially outer surface 60 and rearward cushion ring assembly 34 circumferentially surrounds rearward section 60b of hub radially outer surface 60. It should be noted that stator 16 and sprocket 30 are centered about axis 13, consequently, axis 13 will hereinafter be referred to as sprocket axis 13.

Forward cushion ring assembly 32 and rearward cushion ring assembly 34 will now be described with emphasis on FIGS. 4-7; however, since forward cushion ring assembly 32 and rearward cushion ring assembly 34 may each be substantially the same, forward cushion ring assembly 32 and rearward cushion ring assembly 34 will be concurrently described as cushion ring assembly 32, 34. Cushion ring assembly 32, 34 provides a compliant surface upon which drive chain 15 rides which is resistant to separation from stator 16, thereby extending the service life of cushion ring assembly 32, 34 to reduce noise and vibration. Cushion ring assembly 32, 34 includes a cushion ring 62 and a retention ring 64 which is partially embedded within cushion ring 62 and which provides axial and radial retention of cushion ring 62 to stator 16. Cushion ring 62 and retention ring 64 will be described in greater detail in the paragraphs that follow.

Retention ring 64 is defined by a retention ring rim 66 which engages hub radially outer surface 60 circumferentially in an interference fit in order to maintain the position of retention ring 64 on stator 16. In order to enhance the retention quality of retention ring 64, retention ring rim 66 may be inclined relative to hub radially outer surface 60, thereby allowing a retention ring corner 68 at the extremity of retention ring rim 66 to bite into hub radially outer surface 60, thereby forming a line contact between retention ring rim 66 and hub radially outer surface 60. More specifically, retention ring rim 66 may be inclined upward toward sprocket teeth 30a, thereby allowing retention ring 64 to be slid onto stator 16 toward sprocket teeth 30a while preventing retention ring 64 from moving away from sprocket teeth 30a.

Retention ring 64 also includes a retention ring flange 70 which extends outward from retention ring rim 66 away from sprocket axis 13, i.e. in a direction that is increasing in distance from sprocket axis 13. As shown, retention ring flange 70 may extend radially outward from retention ring rim 66. A space is formed axially between retention ring flange 70 and sprocket teeth 30a within which cushion ring 62 is located and retained axially by retention ring flange 70. As shown, retention ring flange 70 may comprise an array of retention ring flange segments 70a extending from retention ring flange 70 in the same direction as retention ring flange 70. The array of retention ring flange segments 70a is centered about sprocket axis 13 such that retention ring flange segments 70a may each be equally sized and equally spaced.

Retention ring 64 also includes features which provide radial retention of cushion ring 62 to stator 16. As illustrated herein, the features which provide radial retention of cushion ring 62 to stator 16 are retention ring tabs 72 which extend away from retention ring flange 70 toward sprocket teeth 30a. As shown, retention ring tabs 72 may extend from retention ring flange 70 at the spaces formed between retention ring flange segments 70a. As a result, a space is formed radially between retention ring tabs 72 and hub radially outer surface 60 within which cushion ring 62 is located and retained radially by retention ring tabs 72. In this way, retention ring flange segments 70a and retention ring tabs 72 extend from retention ring flange 70 in an alternating pattern.

Retention ring 64 is preferably made from metal, and may be, by way of non-limiting example only, spring steel. Making retention ring 64 from metal allows metal punching and stamping techniques to be used to form retention ring 64 from an inexpensive sheet of metal. Consequently, retention ring tabs 72 may be portions of sheet metal that are deformed when forming the spaces between retention ring flange segments 70a. While forming retention ring 64 from metal may be preferable, other materials such as plastic may be used, provided that the material selected offers adequate strength to retain cushion ring 62 to stator 16.

Cushion ring 62 is made of a compliant and resilient material that can be formed to shape in an injection molding process, i.e. a process in which the material for cushion ring 62 is fed into a heated compartment to melt the material which is then forced into a mold cavity where it is cooled to take the shape of cushion ring 62. Preferably, cushion ring 62 is an elastomer, i.e. rubber, and more preferably a synthetic elastomer such as, by way of non-limiting example only, hydrogenated nitrile. Cushion ring 62 may be molded in one of two ways. In a first method, retention ring 64 is first positioned on stator 16. Then, in a subsequent operation, cushion ring 62 is injection molded onto stator 16 such that retention ring 64 in partially embedded within cushion ring 62. In this way, when formation of cushion ring assembly 32, 34 is completed, cushion ring assembly 32, 34 is already in its finished position on stator 16. In a second method, cushion ring 62 is formed by injection molding in a mold (not shown) which contains retention ring 64 prior to being positioned on stator 16. The injection molding process results in retention ring 64 being partially embedded within cushion ring 62. Then, in a subsequent operation, cushion ring assembly 32, 34 is positioned on stator 16.

In operation, drive chain 15 is driven by the crankshaft of internal combustion engine 10. Drive chain 15 engages sprocket 30 such that inner links 15b and outer links 15c come into contact with cushion ring 62 of forward cushion ring assembly 32 and rearward cushion ring assembly 34, thereby reducing noise and vibration between the interface of sprocket 30 and drive chain 15. Since retention ring 64 is partially embedded within cushion ring 62 such that cushion ring 62 in interlocked with retention ring 64, cushion ring 62 is less susceptible to separation from stator 16, thereby extending the service life of cushion ring assembly 32, 34 to reduce noise and vibration.

Rotation of sprocket 30 by drive chain 15 results in rotation of stator 16. When no oil is being supplied or drained from advance chambers 46 and retard chambers 48, rotor 18 is hydraulically locked to stator 16. Consequently, rotation of sprocket 30 is transferred in a one-to-one relationship to camshaft 14. However, if a change in phase relationship is desired between the crankshaft and camshaft 14, oil is supplied to advance chambers 46 and drained from retard chambers 48 or oil is supplied to retard chambers 48 and drained from advance chambers 46 via an oil control valve 74 which receives pressurized oil from an oil source 76. Oil control valve 74 supplies oil to, and receives oil from, advance chambers 46 and retard chambers 48 through camshaft advance passages 78 and camshaft retard passages 80 respectively which are formed in camshaft 14. While oil is being supplied and vented, rotor 18 rotates relative to stator 16, thereby causing camshaft 14 to speed up or slow down relative to stator 16 until supplying and venting of oil is stopped and rotor 18 is again hydraulically locked relative to stator 16. In this way, rotor 18 can be rotated relative to stator 16 in order to establish a desired timing or phase relationship between the crankshaft and camshaft 14.

It should be noted that camshaft phaser 12 has been described herein in simplified form, and may include additional features that are known in the camshaft phaser art, such as, by way of non-limiting example only, a bias spring which biases rotor 18 to a predetermined position relative to stator 16 and one or more lock pins which mechanically lock rotor 18 in a predetermined position relative to stator 16. Further features of camshaft phaser 12 are described in U.S. Pat. No. 8,056,519 to Cuatt et al. which is hereby incorporated herein by reference in its entirety.

It should also be noted that while camshaft phaser 12 has been described herein as a hydraulically actuated camshaft phaser which generically has an input member illustrated as stator 16 and an output member illustrated as rotor 18, it should be understood that the present invention is equally applicable to other types of camshaft phasers which include an input member and an output member. For example, electrically actuated camshaft phasers have been developed which utilized an electric motor and a gear drive mechanism to change the phase relationship between the input member and the output member. One example of such an electrically actuated camshaft phaser is shown in U.S. Pat. No. 8,584,633 to David et al. which is hereby incorporated herein by reference in its entirety.

It should also be noted that while the present invention has been described in the context of a sprocket for a camshaft phaser, it should be understood that the present invention is equally applicable to sprockets which have a fixed phase relationship. Furthermore, the present invention is equally applicable to sprockets used in applications other than for transmitting rotation from a crankshaft to a camshaft, i.e. a sprocket of any rotational system that is driven by a drive chain or a sprocket of any rotational system that drives a drive chain.

While this invention has been described in terms of preferred embodiments thereof, it is not intended to be so limited.

We claim:

1. A sprocket assembly which is either driven by a drive chain or which drives said drive chain, said sprocket assembly comprising:
    a hub centered about a sprocket axis, said hub defining a hub radially outer surface;
    a plurality of sprocket teeth extending radially outward from said hub such that said plurality of sprocket teeth divide said hub radially outer surface into a forward section and a rearward section;
    a forward cushion ring assembly adjacent to said plurality of sprocket teeth and circumferentially surrounding said forward section of said hub radially outer surface; and
    a rearward cushion ring assembly adjacent to said plurality of sprocket teeth and circumferentially surrounding said rearward section of said hub radially outer surface;
    wherein said forward cushion ring assembly and said rearward cushion ring assembly each comprise:
    a cushion ring adjacent to said plurality of sprocket teeth and circumferentially surrounding said hub radially outer surface; said cushion ring being resilient and compliant; and
    a retention ring which is partially embedded within said cushion ring and which engages said hub radially outer surface in an interference fit, said retention ring providing axial and radial retention of said cushion ring to said hub.

2. A sprocket assembly as in claim 1, wherein said retention ring comprises:
    a retention ring rim which engages said hub radially outer surface circumferentially in an interference fit;
    a retention ring flange with extends from said retention ring rim in a direction outward relative to said sprocket axis such that said cushion ring is located axially between said retention ring flange and said plurality of sprocket teeth.

3. A sprocket assembly as in claim 2, wherein said retention ring flange includes a plurality of retention ring flange segments extending from said retention ring flange in a direction outward relative to said sprocket axis such that said plurality of retention ring flange segments are spaced circumferentially around said retention ring flange.

4. A sprocket assembly as in claim 3, wherein said retention ring further comprises a plurality of retention ring tabs which extend from said retention ring flange toward said plurality of sprocket teeth such that said cushion ring is located radially between said plurality of retention ring tabs and said hub radially outer surface.

5. A sprocket assembly as in claim 4, wherein said plurality of retention ring flange segments and said plurality of retention ring tabs extend from said retention ring flange in an alternating pattern.

6. A sprocket assembly as in claim 2, wherein:
    said retention ring rim defines a retention ring corner at an extremity of said retention ring rim; and
    said retention ring rim is inclined relative to said hub radially outer surface such that said retention ring corner forms a line contact with said hub radially outer surface.

7. A sprocket assembly as in claim 2, wherein said retention ring further comprises a plurality of retention ring tabs which extend from said retention ring flange toward said plurality of sprocket teeth such that said cushion ring is located radially between said plurality of retention ring tabs and said hub radially outer surface.

8. A sprocket assembly as in claim 2, wherein said retention ring further comprises features such that said cushion ring is located radially between said features and said hub radially outer surface.

9. A sprocket assembly as in claim 1, wherein said retention ring is metal and said cushion ring is an elastomer.

10. A sprocket assembly as in claim 1, wherein said sprocket assembly is a camshaft phaser for use with an internal combustion engine for controllably varying the phase relationship between a crankshaft and a camshaft in said internal combustion engine, said camshaft phaser comprising:
    an input member connected to said plurality of sprocket teeth such that said input member is rotated by said plurality of sprocket teeth in a one-to-one relationship with said plurality of sprocket teeth; and
    an output member driven by said input member and connectable to said camshaft, said output member being rotatable relative to said input member such that rotation of said output member relative to said input member results in a change in phase relationship between said crankshaft and said camshaft.

11. A sprocket assembly as in claim 1, wherein said sprocket assembly is a camshaft phaser for use with an internal combustion engine for controllably varying the phase relationship between a crankshaft and a camshaft in said internal combustion engine, said camshaft phaser comprising:
    a stator having a plurality of lobes and connectable to said crankshaft of said internal combustion engine through said drive chain to provide a fixed ratio of rotation between said stator and said crankshaft; and
    a rotor coaxially disposed within said stator, said rotor having a plurality of vanes extending radially outward and interspersed with said plurality of lobes defining alternating advance chambers and retard chambers, wherein said advance chambers receive pressurized oil in order to change the phase relationship between said crankshaft and said camshaft in an advance direction and said retard chambers receive pressurized oil in order to change the phase relationship between said camshaft and said crankshaft in a retard direction.

* * * * *